(12) United States Patent
Davis et al.

(10) Patent No.: US 7,272,663 B2
(45) Date of Patent: Sep. 18, 2007

(54) METHOD AND SYSTEM FOR DELINEATING DATA SEGMENTS SUBJECTED TO DATA COMPRESSION

(75) Inventors: Gordon Taylor Davis, Chapel Hill, NC (US); Jeffrey Haskell Derby, Chapel Hill, NC (US); Malcolm Scott Ware, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1096 days.

(21) Appl. No.: 09/941,043

(22) Filed: Aug. 28, 2001

(65) Prior Publication Data

US 2003/0043806 A1   Mar. 6, 2003

(51) Int. Cl.
    *G06F 15/16* (2006.01)
(52) U.S. Cl. .................. 709/247; 709/231; 709/232
(58) Field of Classification Search ............. 709/247, 709/236, 250, 231, 232
    See application file for complete search history.

(56) References Cited

U.S. PATENT DOCUMENTS

| | | | | |
|---|---|---|---|---|
| 4,937,573 | A |  | 6/1990 | Silvio et al. ................ 341/67 |
| 5,258,983 | A | * | 11/1993 | Lane et al. ................ 370/477 |
| 5,389,922 | A | * | 2/1995 | Seroussi et al. ............ 341/51 |
| 5,606,552 | A |  | 2/1997 | Baldwin et al. ............ 370/474 |
| 5,640,399 | A |  | 6/1997 | Rostoker et al. ........... 370/392 |
| 5,666,487 | A |  | 9/1997 | Goodman et al. ..... 395/200.76 |
| 5,701,302 | A |  | 12/1997 | Geiger ....................... 370/521 |
| 5,742,599 | A | * | 4/1998 | Lin et al. ................ 370/395.65 |
| 5,822,321 | A | * | 10/1998 | Petersen et al. ............ 370/474 |
| 5,870,036 | A | * | 2/1999 | Franaszek et al. ........... 341/51 |
| 5,896,383 | A |  | 4/1999 | Wakeland ................... 370/400 |
| 5,930,265 | A |  | 7/1999 | Duault et al. .............. 370/473 |
| 5,953,339 | A | * | 9/1999 | Baldwin et al. ........... 370/397 |
| 5,991,308 | A |  | 11/1999 | Fuhrmann et al. ......... 370/474 |
| 6,088,355 | A |  | 7/2000 | Mills et al. ................. 370/392 |
| 6,118,785 | A |  | 9/2000 | Araujo et al. .............. 370/401 |
| 6,151,318 | A | * | 11/2000 | Woodward et al. ........ 370/392 |
| 6,246,349 | B1 | * | 6/2001 | Malik et al. ................ 341/106 |
| 6,438,556 | B1 | * | 8/2002 | Malik et al. ................ 707/101 |
| 6,522,651 | B2 | * | 2/2003 | Herrmann ................ 370/395.2 |
| 6,535,526 | B1 | * | 3/2003 | Oyamada et al. .......... 370/477 |
| 6,615,382 | B1 | * | 9/2003 | Kang et al. ................ 714/748 |
| 6,834,283 | B1 | * | 12/2004 | Satoh ......................... 707/101 |
| 2002/0199203 | A1 | * | 12/2002 | Duffy et al. ................ 725/109 |
| 2003/0030575 | A1 | * | 2/2003 | Frachtenberg et al. ....... 341/51 |
| 2004/0213291 | A1 | * | 10/2004 | Beshai et al. .............. 370/473 |

* cited by examiner

*Primary Examiner*—Zarni Maung
*Assistant Examiner*—Nghi Tran
(74) *Attorney, Agent, or Firm*—Sawyer Law Group LLP

(57) ABSTRACT

A method and system for compressing and transmitting data using asynchronous transfer mode (ATM) is disclosed. The data include a plurality of segments. Each of the plurality of segments has a first end and a second end. In one aspect, the method and system include representing the first end of a segment with a partition compression code word and compressing a remaining portion of the segment. The method and system could also combine the marking of the boundary and subsequent data into a compound compression code word. In another aspect, the method and system include representing the first end of a segment with a transparent mode command, transmitting the transparent mode command, and transmitting a remaining portion of the segment.

5 Claims, 5 Drawing Sheets

METHOD AND SYSTEM FOR DELINEATING DATA SEGMENTS SUBJECTED TO DATA COMPRESSION

FIELD OF THE INVENTION

The present invention relates to communications systems, and more particularly to a method and system for delineating data segments that are to be compressed in an asynchronous transfer mode communication system.

BACKGROUND OF THE INVENTION

FIG. 1 depicts a conventional computer network 1. For clarity, only some of the components of the network 1 are shown. The computer network 1 includes hosts 2, 4 and 6 and server 8. The hosts 2, 4 and 6 and the server 8 are coupled through a switch 5. The computer network 1 is coupled to the Internet 9 via a gateway 7. The computer network 1 could be coupled to other networks (not shown) through the Internet 9 or by other means. In addition, the conventional computer network 1 could include other and/or additional components (not shown).

In order to communicate between portions of the network 1, asynchronous transfer mode ("ATM") technology is typically used. When sending data from a host 2, 4, 6 within ATM network 1 to devices connected through the internet 9, an ATM packet data unit ("PDU") is typically used to send internet protocol ("IP") packets to gateway 7, where the ATM protocol is converted to IP. The ATM PDU can have a varying payload length containing the IP packet, but typically includes additional overhead in the form of a header, other information and padding. In order to transmit packets, the PDUs are partitioned by a lower, physical layer into one or more ATM cells. Each ATM cell has a fixed length of fifty three bytes including a five byte ATM header and a forty-eight byte payload. In an AAL5 ATM PDU, overhead is added to the ATM PDU in order to facilitate transmission and detection of the IP packet within the PDU. In particular, a header, an indication of the length, control, a checksum and up to forty eight bytes of padding are added to the PDU to ensure that the PDU terminates at a boundary of an ATM cell.

For example, FIG. 2 depicts a conventional ATM PDU 10 for a particular IP packet. The conventional ATM PDU 10 includes a header 12, additional information 14, the data for the IP packet 16 and, in some cases, the padding 18. The information 14 includes the length, control, and checksum for the IP packet. The padding 18 is added to the data 16 for the IP packet to ensure that the ATM PDU 10 has the appropriate length. Thus, the padding 18 may be of variable size, depending upon the size of the data 16. Consequently, the ATM PDU 10 will end on a boundary of an ATM cell, which has a fixed length discussed below. Furthermore, a particular conventional ATM PDU 10 will carry only a single IP packet.

The conventional ATM PDUs 10 are partitioned by a lower layer for transmission. In a conventional system, the conventional ATM PDUs 10 may be partitioned to become the payload of conventional ATM cells. Each conventional ATM cell is fifty three bytes in length and has a payload of forty-eight bytes. A single conventional ATM PDU 10 may be spread over multiple conventional ATM cells in order to accommodate the entire conventional ATM PDU. The conventional ATM cells are then transmitted as a bitstream. Furthermore, it may be desirable to compress the payload of each conventional ATM cell.

FIG. 3 depicts a bitstream 30 of the conventional ATM cells 20, 20' and 20" when transmitted through the network. Each of the ATM cells 20, 20' and 20" has a header 22, 22' and 22" and a payload 24, 24' and 24", which may be scrambled. The payload 24, 24' and 24" are where portions of the conventional ATM PDU 10 would be carried. As can be seen in FIG. 3, each of the conventional ATM cells 20, 20' and 20" are fifty-three bytes in length. When the ATM cell 20, 20' and 20" is transmitted through the network 1, the payload 24, 24' and 24" of the ATM cell 20, 20' and 20", which includes everything in the ATM cell 20, 20' and 20" except the header 22, 22' and 22", is scrambled. The payload 24, 24' and 24" is scrambled in order to aid in the detection of ATM cell boundaries. In other words, scrambling the payload 24, 24' and 24" aids in allowing the detection of headers 22, 22' and 22". This is because scrambling the payload 24, 24' and 24" reduces the possibility that a portion of the data 16 for the IP packet or the padding 18 will mimic the header 22, 22' or 22". Thus, the recipient of the bitstream 20 is better able to separate individual ATM cells 20, 20' and 20". As a result, individual conventional ATM PDUs 10 can also be detected and the IP packets carried by the conventional ATM PDUs 10 reconstructed.

Although the conventional ATM PDU 10, THE conventional ATM cell 20, 20' or 20" and the conventional bitstream 30 allow IP packets to be sent through the network 1, one of ordinary skill in the art will readily recognize that there are drawbacks to the use of the conventional PDU 10, the conventional ATM cell 20, 20' or 20" and the conventional bitstream 30. The conventional ATM PDU 10 is for a single IP packet. If the IP packet is short, the data 16 for the IP packet consumes only a very small amount of the conventional ATM PDU 10. Consequently, much of the conventional ATM PDU 10 may be taken up by the padding 18. As a result, much what will be transmitted using the conventional ATM PDU 10 can be padding and overhead that may not be used by the recipient. Transmission of this unused information through the network 1 adversely affects the efficiency of the network 1.

Furthermore, it would be desirable to compress the conventional ATM cells 10 including PDU headers and padding in order to improve their efficiency of transmission through the network. Compression at this lower layer requires that detection of errors be guaranteed to a high degree of certainty. The current error checking code used for ATM utilizes only eight bits and is thus an inadequate safeguard for compression at this layer. Other error detection mechanisms could function. For example, a physical layer mechanism could be used to provide error detection. In such a case, another mechanism other than the checksum provided in the information 14 would be used to perform error detection. However, compression and error checking at this lower physical layer still encounters difficulties because of the above-mentioned scrambling of the payload 24, 24' or 24" of the conventional ATM cell 20, 20' or 20". Once the payload 24, 24' or 24" of the conventional ATM cell 20, 20' or 20", respectively, is scrambled, decompression of the payload 24, 24' or 24" becomes difficult or impossible. In the alternative, only the headers 22, 22' or 22" could be compressed. Consequently, the data 16 for the IP packet, as well as some of the overhead provided by ATM PDU cannot be compressed.

In the alternative, only the header 22, 22' or 22" might be compressed, while the remainder of the conventional ATM cell 20, 20' or 20" is uncompressed. Thus, the portion of the conventional ATM cell 20, 20' or 20" that is scrambled is not compressed. Furthermore, the header 22, 22' or 22" is often highly compressible. Consequently, the size of the header 22, 22' or 22" may be greatly reduced. This scheme allows the compressed header 22, 22' or 22" to be decompressed by a recipient. The scrambled portion of the conventional ATM cell 20, 20' or 20" is transmitted uncompressed and is thus available to the recipient. Although compressing only the header 22, 22' and 22" allows the transmission and recovery of the conventional ATM cell 20, 20' or 20", one of ordinary skill in the art will readily recognize that compressing only the headers 22, 22' and 22" results in a relatively small benefit. This is because the payload 24, 24' and 24" occupy the majority of the conventional ATM cell 20, 20' and 20", respectively. Compressing headers 22, 22' and 22" may also complicate recovery of the ATM cell boundary at the receiving end.

In yet another scheme, only the payload 24, 24' and 24" of the conventional ATM cell 20, 20' and 20" is compressed. For example, the header 22, 22' and 22" might remain uncompressed, while the remainder of the ATM cell 20, 20' and 20" would be compressed. However, as discussed above, the headers 22, 22' and 22" are typically highly compressible. Thus, better compression and higher efficiency could be achieved if the headers 22, 22' and 22" could also be compressed. Because of varying lengths of payloads 24, 24' and 24" due to compression, recovery of ATM cell boundaries would also be more complicated.

Accordingly, what is needed is a system and method for more efficiently transmitting IP packets in ATM PDUs and ATM cells. The present invention addresses such a need.

SUMMARY OF THE INVENTION

The present invention provides a method and system for compressing and transmitting data using asynchronous transform mode (ATM). The data include a plurality of segments. Each of the plurality of segments has a first end and a second end. In one aspect, the method and system comprise representing the first end of a segment with a partition code word and compressing a remaining portion of the segment. In another aspect, the method and system comprise representing the first end of a segment with a partition code word, transmitting the partition code word, and transmitting one or more compression code words corresponding to a remaining portion of the segment. In yet another aspect, the partition code word can become the root of one or more compound code words used to compress multiple characters (bytes) into a single compound codeword (the basic mechanism of LZ compression). In another aspect of the invention, the partition code word may be replaced by a transparent mode special command in the case where compression is disabled due to encountering uncompressible data or to user selection.

According to the system and method disclosed herein, the present invention provides a more efficient way of compressing and transmitting data which can allow for multiple IP packets to be provided in a single ATM PDU and improve the efficiency of transmitting the IP packets. In an alternate implementation, the present invention provides a more efficient way of compressing a bitstream of ATM cells (both headers and payload) independent of the contents of the ATM cells.

DETAILED DESCRIPTION OF THE INVENTION

The present invention relates to an improvement in computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for compressing and transmitting data using asynchronous transfer mode (ATM). The data include a plurality of segments. Each of the plurality of segments has a first end and a second end. In one aspect, the method and system comprise representing the first end of a segment with a partition compression code word, compressing a remaining portion of the segment and transmitting the compressed segment. In another aspect, the method and system comprise representing the first end of a segment with a partition transparent mode command, transmitting the partition code word, and transmitting a remaining portion of the segment uncompressed.

Thus, in one embodiment of the present invention, it is possible to delineate IP packets within an ATM PDU to enable multiple packets in a single ATM PDU. Thus, the AAL5 overhead for the PDU for can be spread across multiple IP packets. In a second embodiment, it is possible to delineate ATM cells to allow for compression below the ATM cell layer. This enables compression of AAL5 padding and the ATM cell header.

The present invention will be described in terms of a particular network having certain components. However, one of ordinary skill in the art will readily recognize that this method and system will operate effectively for other networks having other and/or additional components. The present invention will be described in terms of certain methods having particular steps. However, one of ordinary skill in the art will readily recognize that this method and system will operate effectively for other methods having additional and/or different steps not inconsistent with the method and system described herein. Moreover, the present invention will be described in the context of a particular transmission mechanisms, ATM AAL5, or ATM cells. However, one of ordinary skill in the art will readily recognize that the present invention is consistent with other protocols and formats.

Figure 1:
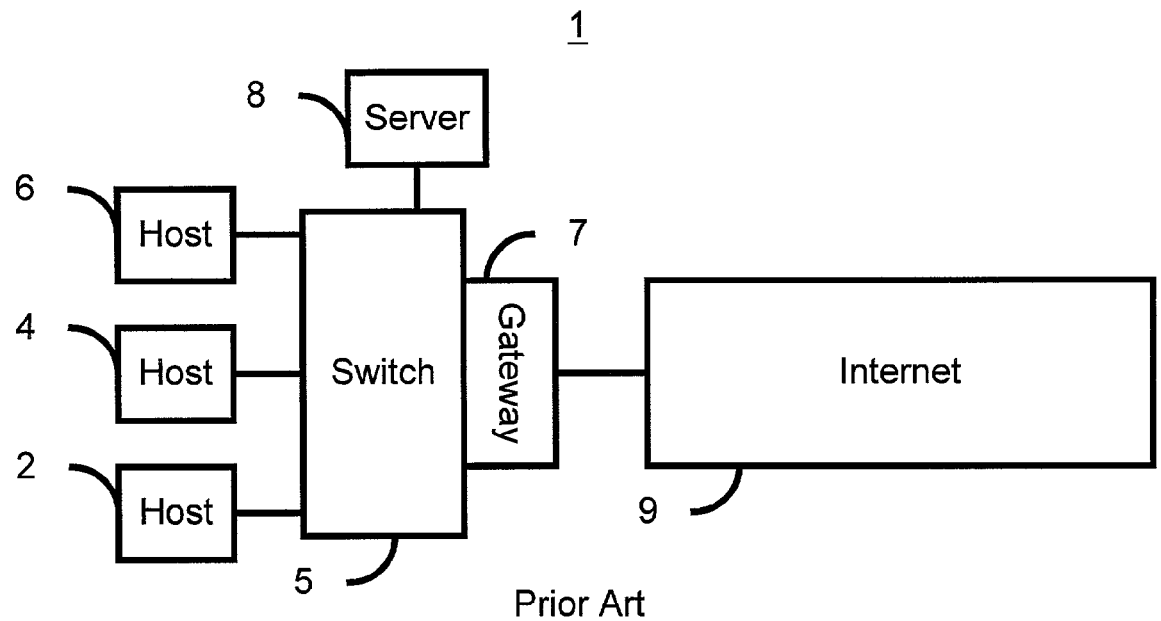
FIG. 1 is a block diagram of a conventional network.
Figure 2:
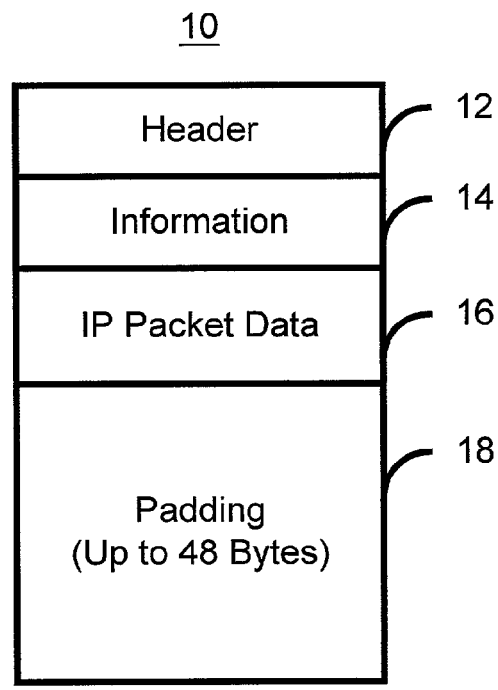
FIG. 2 is a diagram of a conventional ATM PDU.
Figure 3:
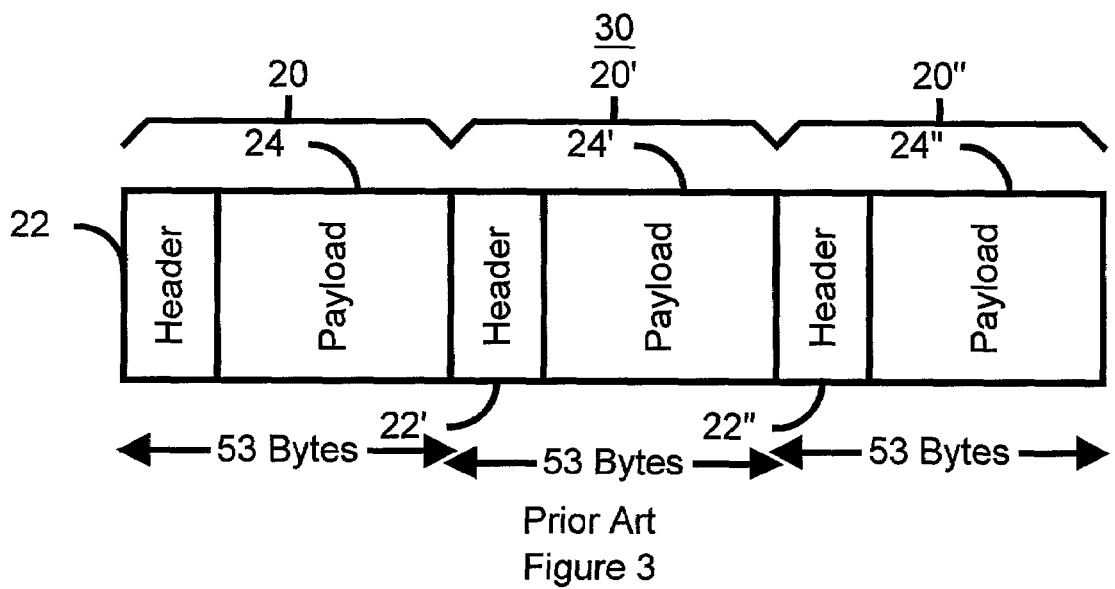
FIG. 3 is a block diagram of a conventional bitstream including conventional ATM cells.
Figure 4:
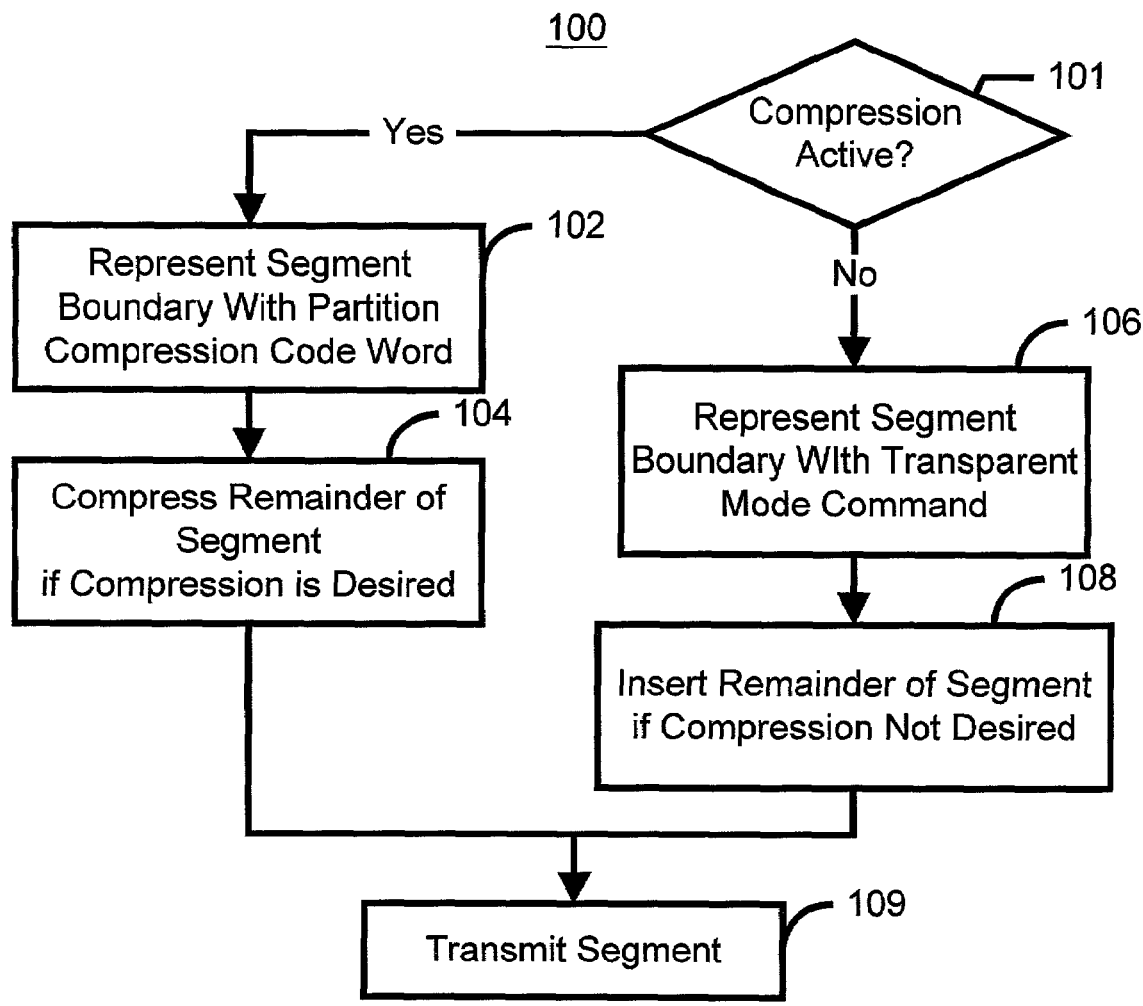
FIG. 4 is a high-level flow chart depicting one embodiment of a method in accordance with the present invention for improving the efficiency of the network using ATM in transmitting data.

To more particularly illustrate the method and system in accordance with the present invention, refer now to FIG. 4, depicting one embodiment of a method 100 in accordance with the present invention for improving the efficiency of the network using ATM in transmitting data. The method 100 is preferably used in a network such as the network 1. The method 100 could be used with IP packets being placed in an ATM PDU or with ATM cells being placed into a bitstream. The data on which the method 100 works is divided into segments. In an embodiment to be used with IP packets being placed in an ATM PDU, each segment is an IP packet. In an embodiment to be used to place ATM cells in a bitstream, each segment is an ATM cell. Each segment thus has a first, starting end and a second end.

A determination is made of whether compression is active, via step 101. If compression is active, then an end of the segment, preferably the starting end, is represented using a partition compression code word, via step 102. Thus, the partition code word represents the boundary of a segment. For example, a data compression procedure such as V.42 bis can be used as a base in implementing the method 100. In such an embodiment, a fixed code word represents the segment boundary. Step 102 thus represents the beginning of the IP packet or ATM cell with the partition compression code word. In one embodiment, step 102 is performed when the beginning of a segment is detected. Thus, after the beginning of a segment is detected, the partition compression code word would be inserted to mark the beginning of that segment using step 102. In one embodiment, the partition code word could be a root of a compound partition compression code word that represents the beginning of the segment as well as additional data in the segment. Thus, beginning portions of different segments that are the same could be represented using the same compound partition compression code word. For example, the starting end of an IP packet being placed in an ATM PDU or the start of an ATM cell could be represented using the code word in step 102.

If the data is to be compressed, then the remaining portion of the segment is compressed using the desired compression algorithm and inserted, via step 104. If it is determined in step 101 that compression is not active, then a transparent mode command is inserted, via step 106. The transparent mode command represents the boundary, preferably the beginning boundary, of the segment. The transparent mode command is preferably a two byte sequence that is similar to other transparent mode commands defined in V42Bis. The remaining portion of the segment is inserted, without compression, after the partition transparent mode command, via step 106. The segment (compressed or uncompressed) is then transmitted, via step 109. Thus, using steps 102 and 104 or 106 and 108, the remainder of the segment is processed. For example, the remainder of the IP packet could be compressed and inserted into the ATM PDU being formed or the remainder of the ATM cell could be compressed and inserted into the bitstream. In a preferred embodiment, the segment will generally be compressed in step 104. Thus, compression is the default for the method 100 and compression must be inactive in order for steps 106 and 108 to be performed.

Thus, using the method 100, the start of a segment can be marked using the partition compression code word or transport mode command. As a result, transmission through the network 1 can be made more efficient. For example, where each segment is an IP packet, multiple IP packets can be placed in a single ATM PDU. These different IP packets can be distinguished because the partition code word marks the start of each IP packet. Thus, an ATM PDU need not hold a single short IP packet with padding and header overhead. Instead, an ATM PDU can hold multiple IP packets while retaining the ability of a recipient to distinguish between IP packets. Similarly, where each segment is an ATM cell, the ATM cells can be compressed, and later decompressed, while retaining the ability to distinguish between ATM cells using the partition compression code word. Thus, the efficiency of the transmission of data through the network can be improved because AAL5 padding and ATM cell headers can be compressed along with the payload for the ATM cell.

Figure 5:
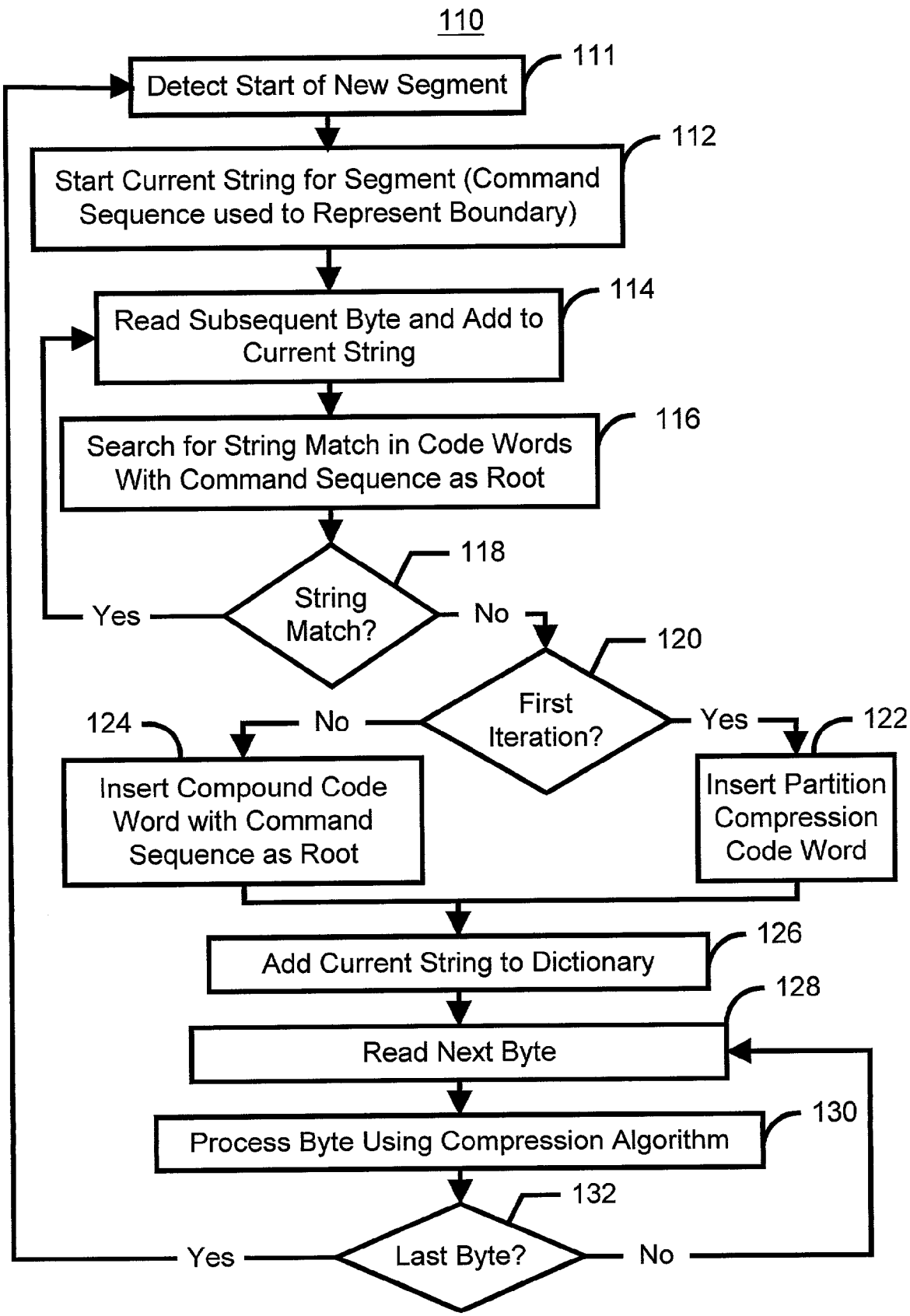
FIG. 5 is a more detailed flow chart of one embodiment of a method in accordance with the present invention for improving the efficiency of the network using ATM in transmitting data.

FIG. 5 is a more detailed flow chart of one embodiment of a method 110 in accordance with the present invention for improving the efficiency of the network using ATM in transmitting data. The method 110 is preferably used in a network such as the network 1. The method 110 is equivalent to steps 102 and 104 of the method 100 depicted in FIG. 4. Referring back to FIG. 5, the method 110 could be used with IP packets being placed in an ATM PDU or with ATM cells being placed into a bitstream. The data on which the method 110 works is divided into segments. In an embodiment to be used with IP packets being placed in an ATM PDU, each segment is an IP packet. In an embodiment to be used to place ATM cells in a bitstream, each segment is an ATM cell. Each segment thus has a first, starting end and a second end.

The beginning of a new segment is detected, via step 111. The start of the current segment is marked by setting the current character string to be represented by the partition command sequence for the boundary, via step 112. Also in step 112, the first byte of a string for the segment is pointed to. Thus, the starting string of the segment is commenced in step 112. A subsequent byte is then read and added to the current string, via step 114. A match for the current string is then searched for, preferably in a dictionary for the compression algorithm, via step 116. The search performed in step 116 is preferably limited to those code words which have the partition command sequence as a root. It is determined whether a match for the string was found in the search, via step 118. If so, step 114 is returned to and the next byte is added to the string. If not, it is determined whether the method 110 is in the first iteration, via step 120. If so, then the partition compression code word is inserted in the transmit bitstream, via step 122. If it is not the first iteration, then the code word that matched the string is inserted in the transmit bitstream, via step 124. This code word is a compound code word that has the partition command sequence word as a root. Thus, the code word inserted for subsequent strings represents more of the package. The current string is then added to the dictionary used by the compression algorithm, via step 126. The next byte of the segment is read, via step 128. The next byte of the segment is processed using the desired compression algorithm, via step 130. It is determined whether the byte just read was the last byte of the segment, via step 132. If so, then step 111 is returned to and the method 110 repeats for the next segment. If not, then step 128 is returned to so that the remaining portion of the segment can be processed using the desired compression algorithm. The next partition compression code word will not be inserted until a new segment is detected.

Because the partition compression code word is used in the method 110 to mark the boundaries between segments, multiple IP packets can be placed in the same ATM PDU and distinguished by the recipient. Similarly, ATM cells can be compressed and placed in a bitstream. In the latter case, a recipient can discriminate between the compressed ATM cells in a bitstream without having to scramble the payload of the ATM cells. Furthermore, because the code word marking the boundary of the segment is inserted only after a match for the current string is not found, the partition code word or a compound code word having the partition as a root can be used. This allows for better compression of the segment. As a result, more IP packets may be placed in a single ATM PDU. Similarly, a particular bit stream may carry more ATM cells. As a result, efficiency of the network 1 can be improved.

Figure 6:
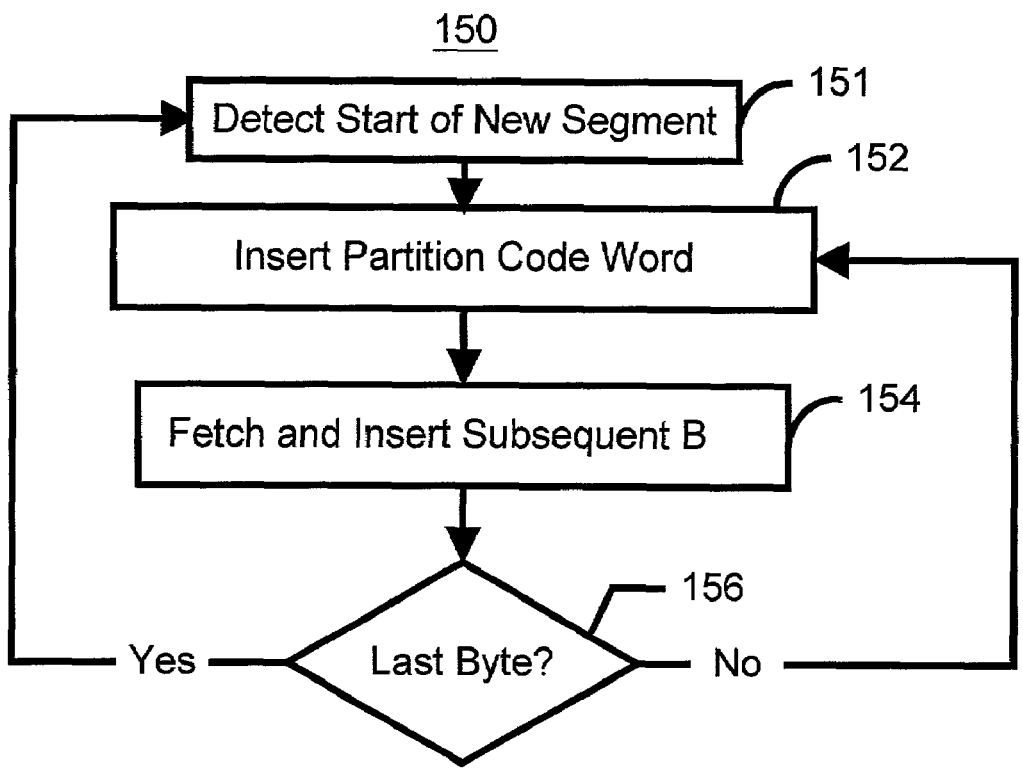
FIG. 6 is a more detailed flow chart of one embodiment of a method in accordance with the present invention for improving the efficiency of the network using ATM in transmitting data in a transparent mode in which a transparent mode command is used in place of a compression code word.

FIG. 6 is a more detailed flow chart of one embodiment of a method 150 in accordance with the present invention for improving the efficiency of the network using ATM in transmitting data in a transparent mode. In the transparent mode, no data compression is performed. The method 150 is preferably used in a network such as the network 1. The method 150 could be used with IP packets being placed in an ATM PDU or with ATM cells being placed into a bitstream. The data on which the method 150 works is divided into segments. In an embodiment to be used with IP packets being placed in an ATM PDU, each segment is an IP packet. In an embodiment to be used to place ATM cells in a bitstream, each segment is an ATM cell. Each segment thus has a first, starting end and a second end.

The beginning of a new segment is detected, via step 151. The transparent mode command sequence is inserted to mark the boundary of a segment, via step 152. In one embodiment, step 152 occurs when the first byte of the segment is fetched, for example from a buffer. A subsequent byte is then fetched and inserted, via step 154. It is then determined whether the last byte has been fetched, via step 156. If not, then step 154 is returned to. If the last byte for the segment has been fetched, then step 152 is returned to for the next segment.

Because the transparent mode command sequence is used in the method 150 to mark the boundaries between segments, multiple IP packets can be placed in the same ATM PDU while allowing a recipient to distinguish different IP packets using the transparent mode command sequence. As a result, more IP packets may be placed in a single ATM PDU. Consequently, efficiency of the network 1 can be improved. Similarly, ATM cells can be partitioned using the transparent mode command sequence, enabling convenient switching between compression and transparent modes.

Figure 7:
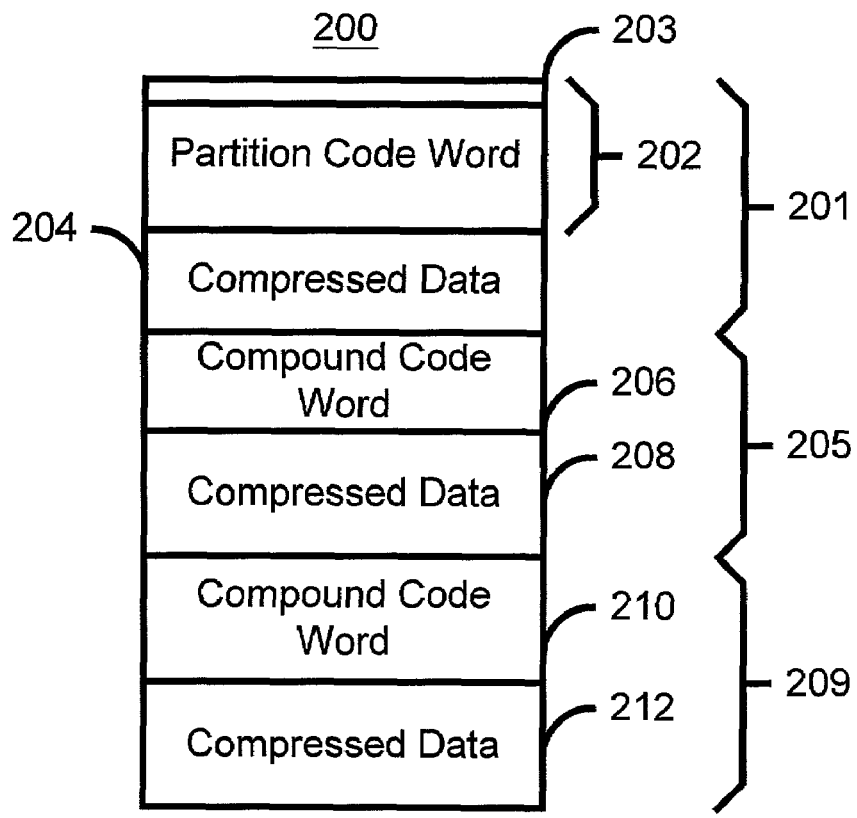
FIG. 7 is a diagram of one embodiment of an ATM PDU in accordance with the present invention.

FIG. 7 is a diagram of one embodiment of an ATM PDU 200 in accordance with the present invention. The ATM PDU 200 carries three IP packets in sections 201, 205 and 209. The ATM PDU 200 carries the partition compression code word 202 and compressed data 204 for the remainder of the first IP packet that is represented by a sequence of other compression code words (i.e. not the partition compression code words). The partition compression code word 202 replaces the compression command sequence 203. The ATM PDU 200 also carries a second partition compression code word 206 for the second IP packet, which has as its root the partition command sequence 203 but also encodes one or more bytes of packet data from the beginning of the packet, and compressed data 208 for the remainder of the segment represented by other compression code words. Similarly, the ATM PDU 200 includes a third partition compression code word 210 corresponding to the partition command sequence 203 as a root and as well as the compressed data 212 for the third IP packet. Thus, a single ATM PDU 200 can carry multiple IP packets the boundaries between which are discernable due to the use of the partition compression code word. Additional IP packets can be attached as required.

Figure 8:
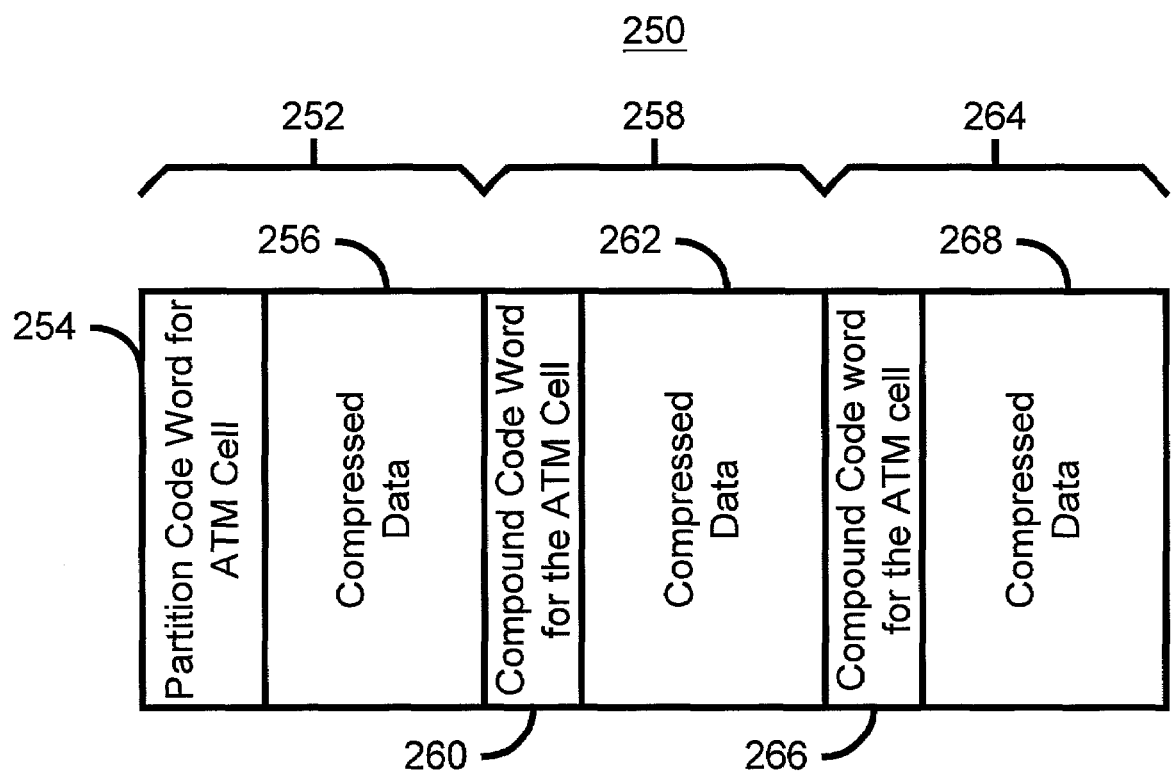
FIG. 8 is a diagram of one embodiment of a bitstream including ATM cells in accordance with the present invention.

FIG. 8 is a diagram of one embodiment of a portion of a bitstream 250 in accordance with the present invention that includes ATM cells 252, 258 and 264. The ATM cell 252 is the first in the bitstream. Thus, the ATM cell 252 includes the partition compression code word 254. The ATM cells 258 and 265 include compound compression code words 260 and 266. The compound compression code words 260 and 266 replace the partition compression code word and also encode additional data in the packet from the beginning of the cells 258 and 265, respectively. The ATM cells 252, 258 and 264 also include compressed data 256, 262 and 268, respectively. The compressed data 256, 262 and 268 would be represented using other code words different from the partition compression code word 254 and from the compound compression code words 260 and 266. If the ATM cells 252, 258 and 264 are formed in accordance with the method 100 or 150, the ATM cells 252, 258 and 264 could include ATM PDUs having multiple IP packets and their own partition command sequence for the IP packets that is different from the cell partition command sequence. Compression is preferably disabled at the PDU level, since it would be redundant with the compression at the lower, ATM cell, level. Because the partition code word 254 or a compound code word 260 or 266 is used, a recipient of the bitstream 250 will be able to differentiate between ATM cells. In addition, the remainder of each ATM cell may be compressed, for example in data 256, 262 and 268 can be compressed. Thus, the bitstream 250 will also be able to more efficiently carry data.

A method and system has been disclosed for more efficiently preparing IP packets for transmission are disclosed. The present invention may be embodied completely or partially in a software program executable on a processor. Software written according to the present invention is to be stored in some form of computer-readable medium, including computer-readable storage medium, such as memory or CD-ROM, and computer-readable transmission medium, such as a computer-readable signal to be transmitted over a network, and executed by a processor. Alternatively, the present invention may be embodied completely or partially in hardware circuitry such as a fixed function state machine. Although the present invention has been described in accordance with the embodiments shown, one of ordinary skill in the art will readily recognize that there could be variations to the embodiments and those variations wouk be within the spirit and scope of the present invention. Accordingly, many modifications may be made by one of ordinary skill in the art without departing from the spirit and scope of the appended claims.

What is claimed is:

1. A method for compressing data for transmission using asynchronous transfer mode (ATM), the data including a plurality of segments, each of the plurality of segments including a first end and a second end, the method comprising the steps of:

representing the first end of a segment of the plurality of segments with a partition compression code word, the segment being at least one of an ATM cell, an ATM PDU, and an IP packet, the first end being a boundary of the ATM cell, the ATM PDU, or the IP packet; and compressing a remaining portion of the segment, wherein the partition compression code word represents a partition command sequence, and wherein the representing step further includes the step of:

providing a compound compression code word to represent the partition command sequence and another portion of the segment, the partition command sequence representing the first end of the segment.

2. A method for compressing data for transmission using asynchronous transfer mode (ATM), the data including a plurality of segments, each of the plurality of segments including a first end and a second end, a dictionary being used in compressing the data, the method comprising the steps of:

representing the first end of a segment of the plurality of segments with a partition compression code word, the partition compression code word representing a partition command sequence, the segment being at least one of an ATM cell, an ATM PDU and an IP packet, the first end being a boundary of the ATM cell, the ATM PDU or the IP packet;

adding bytes to a string including the command sequence representing the first end of the segment until the string does not have a match in the dictionary;

adding a code word to the dictionary, the code word including the partition command sequence as a root, the code word representing the string if the string is obtained in a first iteration;

utilizing the code word in the dictionary to represent the string if the string is not obtained in the first iteration; compressing a remainder of the segment, if any.

3. A system for compressing data for transmission using asynchronous transfer mode (ATM), the data including a plurality of segments, each of the plurality of segments including a first end and a second end, the system comprising:

means for representing the first end of a segment of the plurality of segments with a partition compression code word, the segment being at least one of an ATM cell, an ATM PDU and an IP packet, the first end being a boundary of the ATM cell, the ATM PDU or the IP packet; and means for compressing a remaining portion of the segment, wherein the partition compression code word represents a partition command sequence, and wherein the representing means further includes means for:

providing a compound compression code word to represent the partition command sequence and another portion of the segment, the partition command sequence representing the first end of the segment.

4. A system for compressing data for transmission using asynchronous transfer mode (ATM), the data including a plurality of segments, each of the plurality of segments including a first end and a second end, a dictionary being used in compressing the data, the system comprising:

means for representing the first end of a segment of the plurality of segments with a partition compression code word representing a partition command sequence, the segment being at least one of an ATM cell, an ATM PDU and an IP packet, the first end being a boundary of the ATM cell, the ATM PDU or the IP packet;

means for adding bytes to a string including the first end of the segment until the string does not have a match in the dictionary;

means for adding a code word to the dictionary, the code word including the partition command sequence as a root, the code word representing the string if the string is obtained in a first iteration;

means for utilizing the code word in the dictionary to represent the string if the string is not obtained in the first iteration; means for compressing a remainder of the segment, if any.

5. A computer-readable storage medium containing a program for compressing data for transmission using asynchronous transform mode (ATM), the data including a plurality of segments, each of the plurality of segments including a first end and a second end, a dictionary being used in compressing the data, the program including instructions for:

representing the first end of a segment of the plurality of segments with a partition compression code word, the partition compression code word representing a partition command sequence, the segment being at least one of an ATM cell, an ATM PDU and an IP packet, the first end being a boundary of the ATM cell, the ATM PDU or the IP packet;

adding bytes to a string including the first end of the segment until the string does not have a match in the dictionary;

adding a code word to the dictionary, the code word including the partition command sequence as a root, the code word representing the string if the string is obtained in a first iteration;

utilizing the code word in the dictionary to represent the string if the string is not obtained in the first iteration;

compressing a remainder of the segment, if any.

* * * * *